US010780866B2

(12) United States Patent
Jammes et al.

(10) Patent No.: US 10,780,866 B2
(45) Date of Patent: Sep. 22, 2020

(54) VEHICLE BRAKE MECHANISM WITH PEDAL-JAM DETECTION CAPABILITY

(71) Applicant: Robert Bosch GmbH, Stuttgart (DE)

(72) Inventors: Christian Jammes, Sant Cugat del Valles (ES); Esteve Cortes Guasch, Mataro (ES)

(73) Assignee: Robert Bosch GmbH, Stuttgart (DE)

( * ) Notice: Subject to any disclaimer, the term of this patent is extended or adjusted under 35 U.S.C. 154(b) by 246 days.

(21) Appl. No.: 16/005,940

(22) Filed: Jun. 12, 2018

(65) Prior Publication Data
US 2018/0362000 A1 Dec. 20, 2018

(30) Foreign Application Priority Data

Jun. 16, 2017 (ES) .................................. 201730804

(51) Int. Cl.
B60T 8/34 (2006.01)
B60T 7/04 (2006.01)
B60T 13/74 (2006.01)
B60T 17/22 (2006.01)
B60T 7/12 (2006.01)
B60T 13/66 (2006.01)

(52) U.S. Cl.
CPC ................ B60T 7/042 (2013.01); B60T 7/12 (2013.01); B60T 13/66 (2013.01); B60T 13/662 (2013.01); B60T 13/746 (2013.01); B60T 17/221 (2013.01); B60T 2220/04 (2013.01); B60T 2270/402 (2013.01)

(58) Field of Classification Search
CPC ....... B60T 7/085; B60T 2220/04; B60T 7/042
See application file for complete search history.

(56) References Cited

U.S. PATENT DOCUMENTS 5,658,055 A * 8/1997 Dieringer ................ B60T 13/72
303/114.3
5,772,290 A * 6/1998 Heibel .................... B60T 13/72
303/113.4

(Continued)

FOREIGN PATENT DOCUMENTS

DE 102006020304 A1 9/2008
WO 2015188958 A1 12/2015

(Continued)

Primary Examiner — Nicholas J Lane
(74) Attorney, Agent, or Firm — Norton Rose Fulbright US LLP; Gerard Messina

(57) ABSTRACT

A vehicle brake mechanism that includes a pedal, a piston attached to the pedal, a spring associated with the piston and exerting a longitudinal force on the piston in a direction opposite the braking direction in order to bring the pedal to a resting position, and an autonomous brake module. A manual braking force on the pedal causes a longitudinal movement of the piston and displaces a transmitter element integrally joined to the piston. The autonomous brake module causes a movement of an intermediate plate that displaces the transmitter element and the piston, exerting a longitudinal force on the piston in the braking direction. The brake mechanism determines the force in the direction opposite the braking direction using a sensor situated on or in the intermediate plate and/or the transmitter element.

7 Claims, 3 Drawing Sheets

(56) References Cited

U.S. PATENT DOCUMENTS

| | | | | |
|---|---|---|---|---|
| 5,779,329 | A | * | 7/1998 | Takeshima .............. B60T 7/042 303/113.4 |
| 6,744,360 | B2 | * | 6/2004 | Fulks ...................... B60T 7/042 303/3 |
| 2012/0073286 | A1 | * | 3/2012 | Takayama ............. B60T 13/745 60/538 |
| 2012/0324882 | A1 | * | 12/2012 | Mori ..................... B60T 13/745 60/545 |
| 2015/0360666 | A1 | | 12/2015 | Gerdes et al. |
| 2017/0043756 | A1 | * | 2/2017 | Drumm ................... B60T 7/042 |
| 2019/0389439 | A1 | * | 12/2019 | Panunzio ................. B60T 7/04 |

FOREIGN PATENT DOCUMENTS

| WO | 2017045804 A1 | 3/2017 |
|---|---|---|
| WO | 2017045956 A1 | 3/2017 |

* cited by examiner

VEHICLE BRAKE MECHANISM WITH PEDAL-JAM DETECTION CAPABILITY

CROSS-REFERENCE TO RELATED APPLICATIONS

The present application claims priority under 35 U.S.C. § 119 to ES 201730804, filed in Spain on Jun. 16, 2017, the content of which is hereby incorporated by reference herein in its entirety.

BACKGROUND

In the automotive field, there are different types of mechanisms for acting in a vehicle. Specifically, present-day vehicles have automatic driving-assistance mechanisms and manual driving mechanisms. These mechanisms currently coexist in the vehicle, with the manual mechanisms taking precedence with regard to driving.

Consequently, it is important to identify failures of the manual mechanisms or the occurrence of anomalous situations that go unnoticed by, or escape the control of, the driver.

SUMMARY

The present invention relates to a mechanism for the detection of a jammed pedal, such that a determination can be made, for example, as to whether the mechanism has been blocked, either by damage to the vehicle or because an obstruction is present in the pedal path. This problem is magnified even further when the autonomous brake mechanism is in operation, because the user may believe that the mechanism will brake, whereas in reality the mechanism is jammed.

According to an example embodiment, a vehicle brake mechanism that includes: a pedal for exerting a manual braking force in a braking direction; a piston attached to the pedal; a spring associated with the piston, with the spring exerting a longitudinal force on the piston in a direction opposite the braking direction in order to bring the pedal to a resting position; and an autonomous brake module; where a manual braking force on the pedal causes a longitudinal movement of the piston and displaces a transmitter element integrally joined to the piston, and where the autonomous brake module causes a movement of an intermediate plate that displaces the transmitter element and the piston, exerting a longitudinal force on the piston in the braking direction, the brake mechanism having a component for determining the force in the direction opposite the braking direction, which component is situated in the intermediate plate and/or in the transmitter element.

In the context of the present invention, the term "manual" refers to an action that is carried out and/or caused by the user. Consequently, "manual braking force" refers to any type of force exerted by the user on a mechanism that is suitable for receiving the force, for example, a pedal.

In an example embodiment, the determination of the force in the direction of the resting position is made using an elastic part. The elastic part can be, for example, an elastic lug of an intermediate plate, such as an anti-rotation plate (ARP).

Specifically, the elastic part can be used to define the size of a gap between the transmitter element and the intermediate plate, and, in an example, a sensor determines the force in the direction opposite the braking direction based on a detected size of the gap. The sensor preferably includes a Hall-effect sensor attached to the intermediate plate and a magnet attached to the transmitter element in order to determine the distance between them, so as to enable the calculation of any relative displacement between them that is indicative of a blockage of the brake pedal. Alternatively, the sensor includes a Hall-effect sensor attached to the transmitter element and a magnet attached to the intermediate plate in order to determine the distance between them.

In a particularly preferred embodiment, the mechanism correlates the distance between the plate and the transmitter element with a detection of a jammed-pedal event, for example, through the use of a processor. The correlation can include comparing the distance between the plate and the transmitter element against a given threshold in which the distances below the threshold define a jammed-pedal event.

In another example, the mechanism includes a microswitch for determining the force in the direction opposite the braking direction. The microswitch can be attached to the intermediate plate or to the transmitter element in such a way that a force, in the direction opposite the braking direction, exerted on the transmitter element deforms the elastic part and activates the microswitch.

Furthermore, the transmitter element can include a first support connected to the elastic lug of the intermediate plate and a second, shorter support that defines the maximum deformation of the elastic part and that is configured so as to abut the intermediate plate. The second support is preferably stiffer than the first support, so as to prevent the plastic deformation of the elastic elements, such as the lugs.

In an especially preferred embodiment, the brake module is a hydraulically assisted module.

The present invention is described in greater detail with reference to the following figures, which should be understood as an illustrative and non-limitative example of the invention.

DETAILED DESCRIPTION

Figure 1:
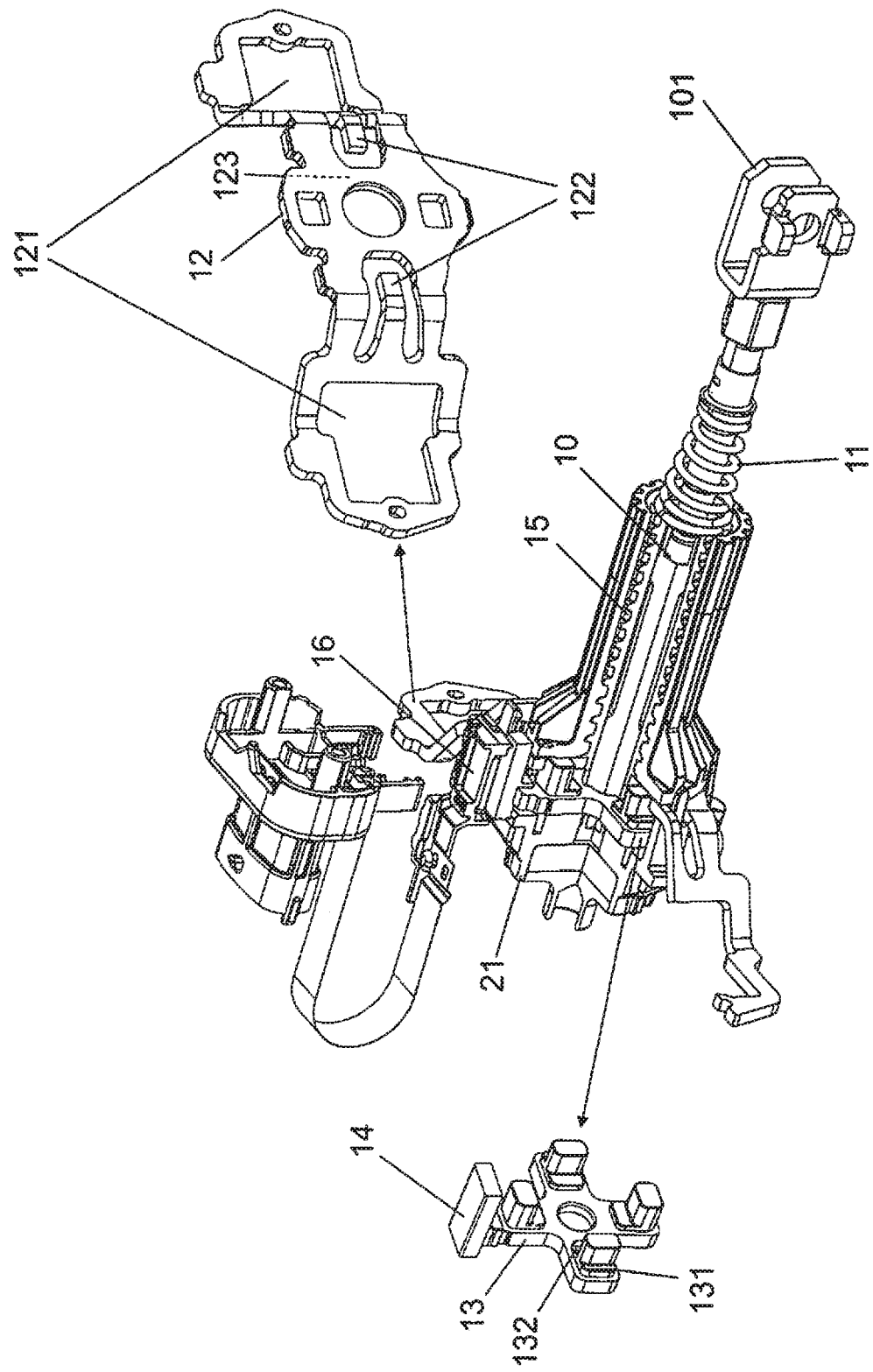
FIG. 1 shows a perspective view of a brake mechanism according to an example embodiment of the present invention.

FIG. 1 shows a brake mechanism according to an example embodiment of the present invention. In this embodiment, the mechanism includes a pedal that is coupled to a brake connection element 101. Brake connection element 101 is associated with a pedal intended to be actuated by the user, and from an initial resting position moves along a braking path to a stop. In order to bring the pedal to the resting position after a braking maneuver has been executed, the mechanism has a spring 11 whose function is to apply a longitudinal force to piston 10 in the direction of the resting position of the pedal, which resting direction is opposite the braking direction.

The mechanism also includes an intermediate plate for the guidance and transmission of force. In this particular example it is an ARP 12. The intermediate plate can have a plurality of openings 121 that serve as guides and into which a plurality of guide elements are inserted that run along a plurality of guide columns arranged perpendicular to frontal surfaces and to the plane of the central region of the intermediate plate.

The brake mechanism also has a transmitter element 13 that includes a magnet 14 whose purpose is to define, in conjunction with a Hall-effect sensor, the relative displacement between transmitter element 13 and a reference element of the braking system in order to detect a possible jam, as will be explained in greater detail with reference to FIG. 3. Furthermore, transmitter element 13 preferably includes four contact blocks having a first support 131 and a second support 132 with a predefined height difference between the two of them.

When a user carries out a manual braking maneuver, a braking force is exerted on the pedal, which moves brake connection element 101 in a braking direction and, in turn, moves a piston 10 that is integrally joined to brake connection element 101, applying a substantially longitudinal force in the braking direction. The force is transferred to transmitter element 13 by piston 10 and causes a displacement thereof. Transmitter element 13 activates a brake module having a hydraulic output, with the brake module being the one that ultimately exerts a braking force on the wheels and/or axles of the vehicle in which the mechanism is installed. The brake module can also have a mechanical, pneumatic, hydraulic, or electrical assistance function, or a combination thereof, in order to apply the braking action to the vehicle.

The brake mechanism also has an autonomous brake module that, unlike manual braking, transmits an automatic braking force via a spindle 15 to the intermediate plate (in this case, ARP 12) and through it to body 21, which in turn transmits it to the hydraulic output cylinder, thereby achieving braking with no interaction by the user.

From one side, braking forces are exerted between transmitter element 13 and the intermediate plate 12, and that, from the other side, in the case of automatic braking, a force in the direction opposite the braking (i.e., toward the resting position of piston 10) is exerted, with the force in the direction opposite the braking being exerted, under normal conditions, principally by spring 11. If a jammed-pedal event occurs while an automatic braking maneuver is being executed, spindle 15 moves the intermediate plate 12 in the braking direction, and this action in turn displaces transmitter element 13. However, because transmitter element 13 is integrally joined to piston 10, transmitter element 13 would be subjected to a force in the direction opposite the braking, as exerted by spring 11, as well as to an additional force due to the jamming of the pedal.

In an example embodiment of the present invention, intermediate plate 12 can be made of a material that allows an elastic deformation, in the longitudinal direction of piston 10, of a pair of lugs 122 arranged, for example, symmetrically, which define separation gaps 100 with supports 131 of transmitter element 13, and a reference element in which a Hall-effect sensor 16 is provided to detect the relative displacement between them. In the example shown in FIG. 1, Hall-effect sensor 16 is attached to body 21, although in certain embodiments of the present invention it can be attached, for example, to the piston or the brake module.

Figure 2:
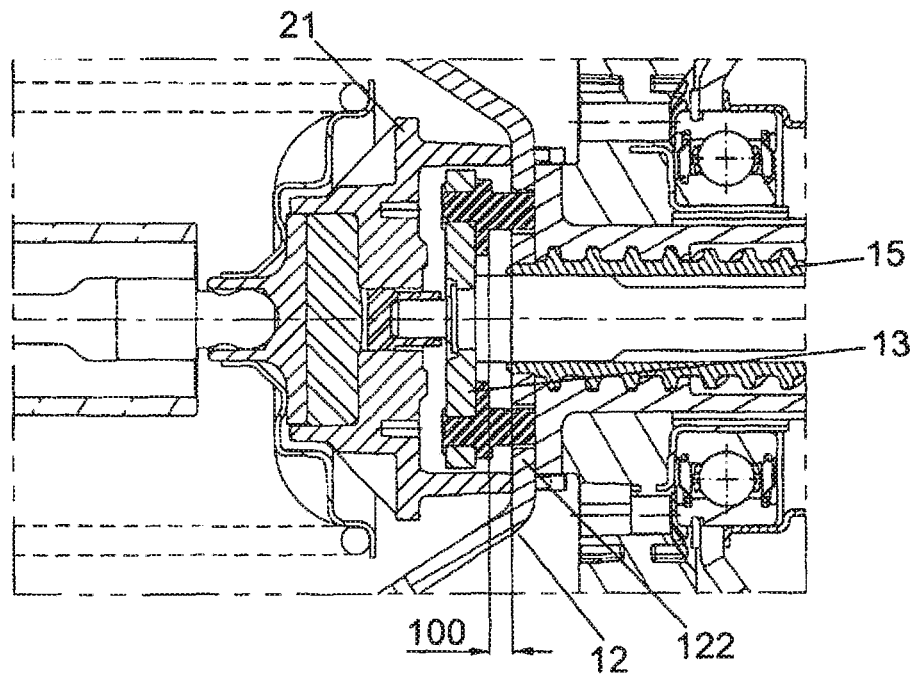
FIG. 2 shows a cross-sectional view of the mechanism from FIG. 1, as well as a brake module in which the mechanism is at rest, according to an example embodiment of the present invention.

With reference to FIG. 2, it can be seen that the mechanism has, in its resting position (i.e., with no execution of autonomous or manual braking maneuvers), a gap 100 between supports 131 of transmitter element 13 and intermediate plate 12. The purpose of gap 100 is to provide a measurement of the level of deformation of the elastic part, because the level of deformation of the elastic part is an indirect measurement of the force exerted by spindle 15 on the brake module. In short, the force in the counter-braking direction can be determined by measuring the distance between transmitter element 13 and intermediate plate 12, i.e., gap 100. If the force in the counter-braking direction is sufficient to deform the elastic part and reduce the size of gap 100 to below a threshold distance, it can then be determined that a jammed-pedal event has occurred.

Figure 3:
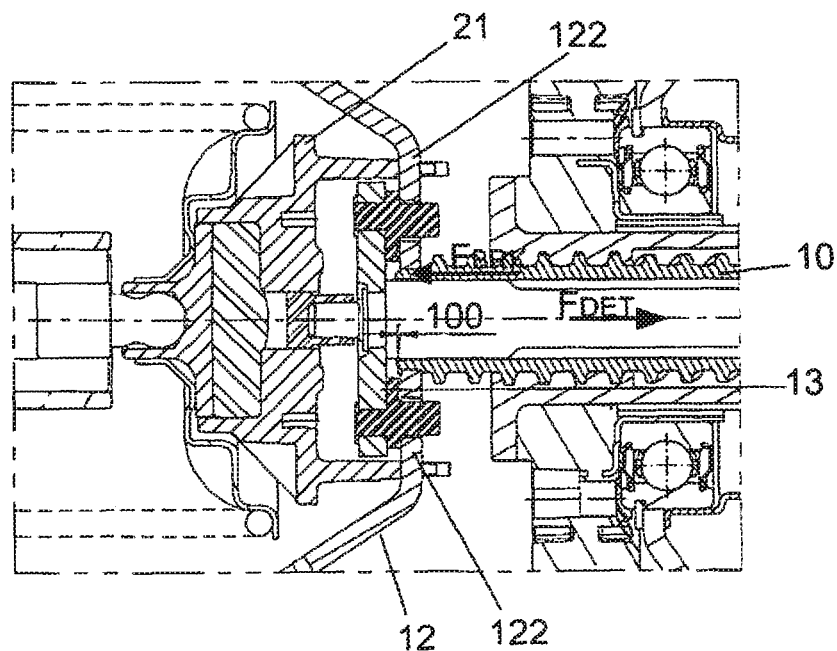
FIG. 3 shows the embodiment from FIG. 2, with the system in autonomous brake mode, according to an example embodiment of the present invention.

FIG. 3 shows an embodiment of the present invention in which the device is executing a braking maneuver in autonomous mode. Specifically, if the forces in ARP 12 are analyzed, it will be seen that, on the one hand, there is a force FBRK, which is the autonomous braking force exerted by spindle 15 on ARP 12, and that, on the other hand, there is a force FEET in the counter-braking direction that is exerted by spring 11 on piston 10 in order to return it to the resting position.

Figure 4A:
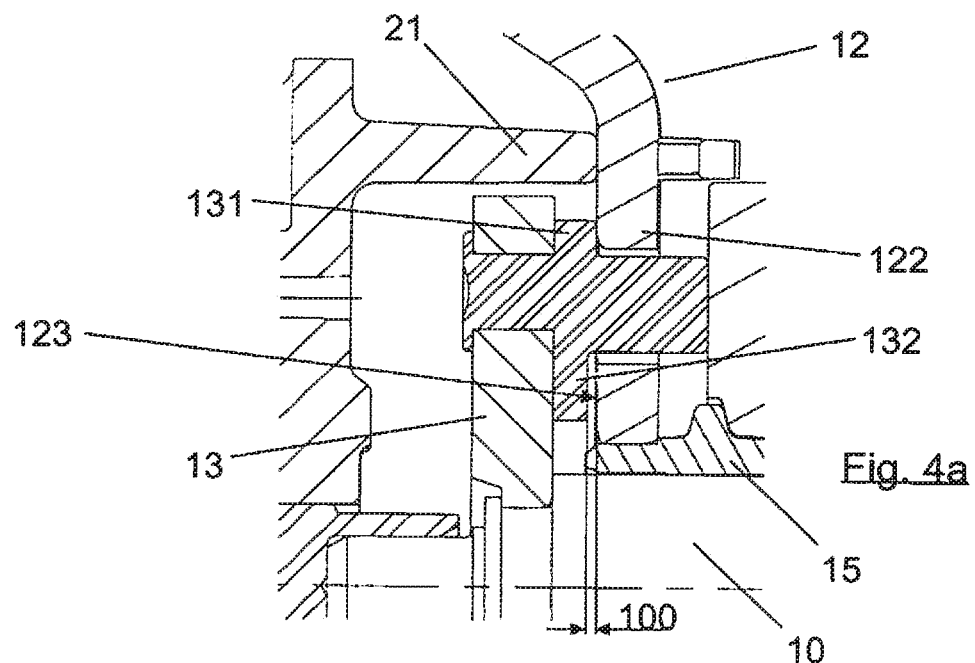
FIG. 4a shows the example of the embodiment from FIG. 3, with the mechanism without a jammed pedal, according to an example embodiment of the present invention.
Figure 4B:
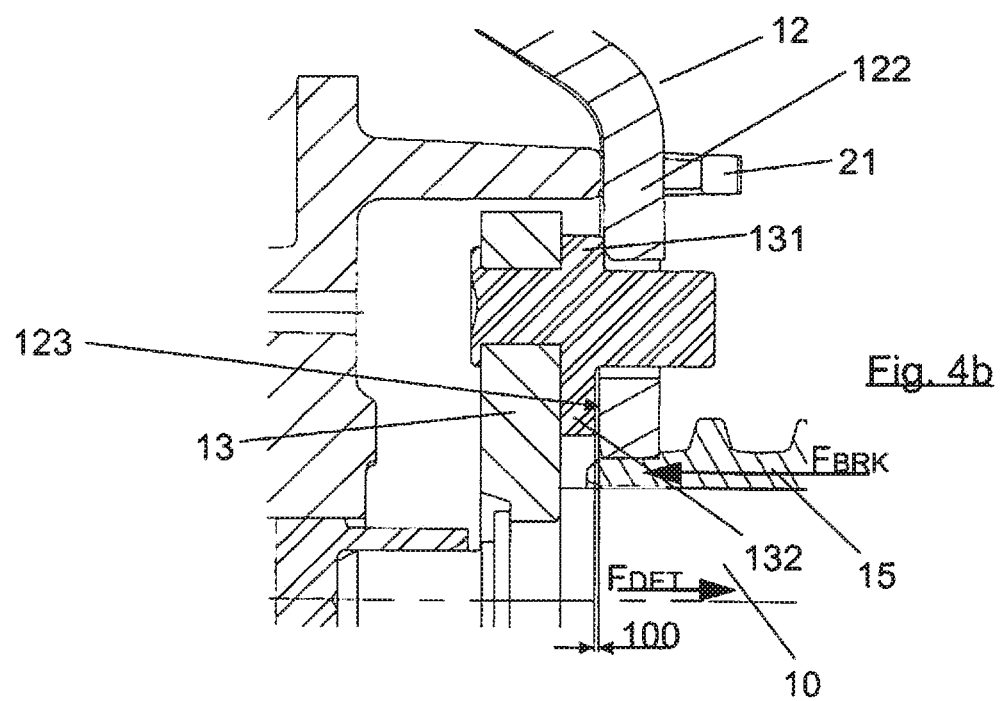
FIG. 4b shows the example of the embodiment from FIG. 3, with the mechanism with a jammed pedal, according to an example embodiment of the present invention.

FIGS. 4a and 4b show the mode of operation of the present invention in the case of automatic braking without a jammed pedal (FIG. 4a) and with the pedal partially jammed (FIG. 4b).

With reference to FIG. 4a, an example of an elastic part is shown. In this case, it is an elastic lug 122 of intermediate plate 12. This figure also shows part of transmitter element 13, which has a plurality of contact blocks that have a first support 131 and a second support 132, in which the height of the first support is greater than the height of the second support. When a braking maneuver is executed via the autonomous brake module, ARP 12 is displaced by spindle 15, causing the first support 131 to come into contact with ARP 12 and to be displaced along with it, thereby activating the brake module. If the pedal is not jammed, the force in FDET (i.e., in the counter-braking direction) is low, because the only element exerting force in this direction is spring 11. Consequently, this force either is insufficient to deform elastic lug 122, or else deforms it in such a way that gap 100 is not modified to a degree sufficient to generate a jammed-pedal event. That is, the distance between transmitter element 13 and the plate remains above a threshold distance that determines the generation of the jammed-pedal event.

With reference to FIG. 4b, the case can be seen in which the pedal becomes jammed, for example, due to an obstruction in the pedal. In this case, the movement of piston 10 and of transmitter element 13 is restricted by the obstruction, and consequently piston 10 exerts a force FDET in the direction opposite the braking direction FBRK in addition to the force exerted by spring 11. The force FDET causes transmitter element 13, acting through the first support 131, to deform elastic lug 122, thereby reducing gap 100, i.e., the distance between intermediate plate 12 and transmitter element 13. In this case, the function of the second support 132 is to make contact with a stop surface 123 of the intermediate plate 12 in order to prevent the plastic deformation of elastic lug 122.

The present invention contemplates the detection of the jamming of the brake pedal, doing so by detecting the force exerted on elastic part 12, for example, by measuring the size of gap 100.

This measurement is preferably done by placing a Hall-effect sensor in the brake module or in intermediate plate 12, in such a way as to enable the determination of the distance from the intermediate plate 12 to a magnetic element, e.g., a magnet 14, associated with transmitter element 13.

In other examples of embodiments, the elastic part can have a microswitch, for example, in the second support 132, so that when the gap 100 is below a threshold value, the ARP actuates a switch that detects the jamming of the pedal.

Another embodiment includes the placement of a load cell between transmitter element 13 and intermediate plate 12 in order to detect the force that is being applied at any time to the block of the elastic part that has the supports. If the force exceeds a threshold value, a jammed-pedal alarm is issued.

What is claimed is:

1. A vehicle brake mechanism that includes:
    a piston;
    a transmitter integrally joined to the piston;
    a pedal attached to the transmitter, wherein a manual braking force is exertable in a braking direction to cause a longitudinal movement of the piston and displacement of the transmitter;
    a spring exerting a longitudinal force on the piston in a direction opposite the braking direction in order to bring the pedal to a resting position of the pedal;
    an intermediate plate on which is exerted;
    a longitudinal force, wherein the longitudinal force is exerted on the intermediate plate, transmitter, and piston in the braking direction; and
    a sensor in or on the intermediate plate or the transmitter and configured to determine a total longitudinal force in the direction opposite the braking direction, wherein:
    the intermediate plate includes the sensor and an elastic part, and
    the elastic part is an elastic lug of the intermediate plate.

2. The mechanism of claim 1, wherein the transmitter includes a first support connected to the elastic lug of the intermediate plate and a second, shorter support that defines a maximum deformation of the elastic part and that is configured so as to abut the intermediate plate.

3. The mechanism of claim 2, wherein in that the second support is stiffer than the first support.

4. The mechanism of claim 1, wherein the elastic part defines a size of a gap between the transmitter and the intermediate plate, and the sensor is configured to determine the size of the gap.

5. The mechanism of claim 1, wherein the sensor includes a Hall-effect sensor attached to the intermediate plate and a magnet attached to the transmitter by which the sensor is configured to determine a distance between the transmitter and the intermediate plate.

6. The mechanism of claim 5, wherein the mechanism is configured to correlate the distance between the intermediate plate and the transmitter with a jammed-pedal event.

7. The mechanism of claim 5, further comprising a processor configured to compare the distance to a predefined threshold and determine an occurrence of a jammed-pedal event in response to a result of the comparison being that the distance is below the predefined threshold.

* * * * *